(12) United States Patent
Wu et al.

(10) Patent No.: US 9,798,706 B2
(45) Date of Patent: Oct. 24, 2017

(54) METHOD FOR GENERATING AN ELECTRONIC SIGNATURE

(71) Applicant: Thinkcloud Digital Technology Co., Ltd., Taichung (TW)

(72) Inventors: Yu-Jen Wu, Taichung (TW);
Chih-Yuan Kuo, Taichung (TW);
Guan-Hong Lu, Taichung (TW)

(73) Assignee: Thinkcloud Digital Technology Co., Ltd., Taichung (TW)

( * ) Notice: Subject to any disclaimer, the term of this patent is extended or adjusted under 35 U.S.C. 154(b) by 208 days.

(21) Appl. No.: 14/321,889

(22) Filed: Jul. 2, 2014

(65) Prior Publication Data

US 2015/0012812 A1    Jan. 8, 2015

(30) Foreign Application Priority Data

Jul. 5, 2013  (TW) .............................. 102124166 A (51) Int. Cl.
*G06F 17/22*    (2006.01)
*G06F 17/24*    (2006.01)
(Continued)

(52) U.S. Cl.
CPC ...... *G06F 17/2247* (2013.01); *G06F 3/04883* (2013.01); *G06F 17/241* (2013.01);
(Continued)

(58) Field of Classification Search
CPC ...... G06F 21/64; G06F 17/241; G06F 17/243; G06F 17/248; G06F 2221/2119;
(Continued)

(56) References Cited

U.S. PATENT DOCUMENTS 6,389,541 B1 *   5/2002   Patterson ................ G06F 21/10
                                                                    705/53
6,549,624 B1 *   4/2003   Sandru ................... G06Q 20/04
                                                                    283/17
(Continued)

FOREIGN PATENT DOCUMENTS

TW        525072       3/2003
TW      200534133     10/2005
TW      201108111      3/2011

OTHER PUBLICATIONS

"Scalable Vector Graphics", published: Aug. 2005, publisher: Wikipedia.com, pp. 1-4.*

(Continued)

*Primary Examiner* — Wilson Tsui
(74) *Attorney, Agent, or Firm* — Trop Pruner & Hu, P.C.

(57) ABSTRACT

In a method for generating an electronic signature, a web server provides a webpage to be displayed on a touch screen of an electronic device, receives a representative signal of a handwritten signature inputted by a signer and a dynamic image that presents a motion of the signer during signing the handwritten signature captured by the dynamic image capturing module simultaneously with the inputting of the handwritten signature. Afterward, the web server stores the dynamic image as a streaming file, compiles a data file that includes the representative signal and the streaming file, and executes the data file in the webpage as an electronic signature.

12 Claims, 6 Drawing Sheets

(51) Int. Cl.
    *G06T 11/60*        (2006.01)
    *G06F 3/0488*     (2013.01)
    *G06F 21/32*      (2013.01)

(52) U.S. Cl.
    CPC ............ *G06F 17/242* (2013.01); *G06F 21/32* (2013.01); *G06T 11/60* (2013.01)

(58) Field of Classification Search
    CPC ............... G06F 17/2247; G06F 17/242; G06F 3/04883; G06F 21/32; G06T 11/60
    See application file for complete search history.

(56) References Cited

U.S. PATENT DOCUMENTS

| | | | | |
|---|---|---|---|---|
| 6,779,178 B1* | 8/2004 | Lloyd | ................... | G06F 17/21 707/999.01 |
| 7,533,268 B1 | 5/2009 | Catorcini et al. | | |
| 7,715,600 B2* | 5/2010 | Avni | ................... | G06F 21/32 382/115 |
| 7,934,098 B1* | 4/2011 | Hahn | ................... | G06F 21/64 713/176 |
| 2004/0221162 A1* | 11/2004 | Kongtcheu | ............. | G06F 21/64 713/178 |
| 2006/0161780 A1* | 7/2006 | Berryman | ............... | G06F 21/64 713/176 |
| 2007/0208994 A1* | 9/2007 | Reddel | ................. | G06F 17/2288 715/205 |
| 2008/0072334 A1* | 3/2008 | Bailey | ................... | G06Q 10/10 726/28 |
| 2010/0002685 A1* | 1/2010 | Shaham | ................ | H04M 3/002 370/352 |
| 2012/0151384 A1* | 6/2012 | Stass | ..................... | G06Q 30/06 715/758 |
| 2012/0284602 A1* | 11/2012 | Seed | .................. | G06Q 20/3274 715/224 |
| 2013/0238966 A1* | 9/2013 | Barrus | .............. | G06K 9/00449 715/223 |
| 2013/0332296 A1* | 12/2013 | Murray, Jr. | ......... | G06Q 30/0605 705/26.1 |

OTHER PUBLICATIONS

Taiwan Search Report issued in corresponding Taiwanese application No. 102124166 dated Nov. 13, 2014 [with English translation], (2 pages).

\* cited by examiner

METHOD FOR GENERATING AN ELECTRONIC SIGNATURE

CROSS-REFERENCE TO RELATED APPLICATION

This application claims priority of Taiwanese Application No. 102124166, filed on Jul. 5, 2013.

BACKGROUND OF THE INVENTION

1. Field of the Invention

The invention relates to a method for generating an electronic signature.

2. Description of the Related Art

A signature traditionally serves the purpose of giving evidence of an intention (e.g., authentication, consent, proof of identity, etc.) of a signer with regard to a document. For paper documents, signatures may be handwritten on paper. However, as electronic documents become prominent, new ways need to be used in order to accommodate the electronic documents. Conventional electronic signatures (e.g., a digital signature) may be created and verified using public key infrastructure (PKI). This may require a signer to store a private key and/or an electronic credential that is uniquely associated with the signer, or to install a dedicated security program in an electronic device in his/her possession. Additionally, the conventional electronic signatures are represented as strings of text, and have appearances that deviate greatly from traditional handwritten signatures. As a result, people who are accustomed to traditional signatures may be discouraged from using digital signatures.

Taiwanese Patent Publication No. 201042970 discloses a method for imaging an electronic signature. In the method, a device encrypts a plaintext sequence using the PKI, based on a private key provided by a user, to generate a ciphertext sequence. Afterward, the device embeds the ciphertext sequence to a preselected image (e.g., a photo of the user, a signature of the user, etc.) so as to generate an electronic signature that is in the form of the preselected image, and that can be verified using the ciphertext sequence embedded therein.

However, generating an electronic signature using this method still involves a private key and requires the PKI to be employed.

SUMMARY OF THE INVENTION

Therefore, the object of the present invention is to provide a method that is capable of capturing an electronic signature with relative simplicity.

Accordingly, a method of the present invention is for generating an electronic signature. The method is to be implemented by a web server communicating with an electronic device. The electronic device includes a touch screen and a dynamic image capturing module. The method includes the following steps:

(a) providing, by the web server, a webpage to be displayed on the touch screen of the electronic device, the webpage including a signature area;

(b) receiving, by the web server, a dynamic image and a representative signal of a handwritten signature from the electronic device, the representative signal being embedded with a markup language, the handwritten signature being inputted by a signer using the touch screen, the dynamic image presenting a motion of the signer during signing the handwritten signature and being simultaneously captured by the dynamic image capturing module;

(c) storing, by the web server, the dynamic image as a streaming file;

(d) compiling, by the web server, a data file that includes the representative signal and the streaming file; and (e) executing, by the web server, the data file in the webpage as an electronic signature.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
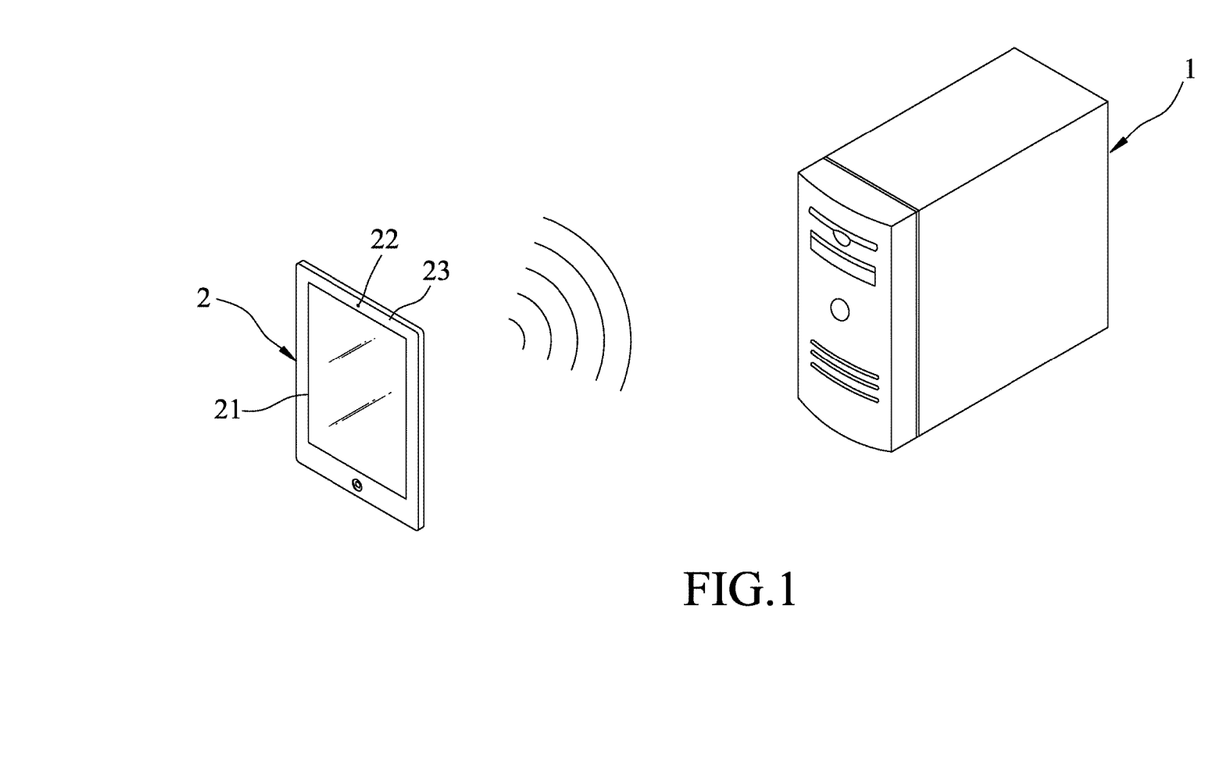
FIG. 1 is a schematic view of a web server and an electronic device used to implement the preferred embodiment of a method for generating an electronic signature according to the invention.

The preferred embodiment of a method for generating an electronic signature according to the present invention may be implemented using a web server 1 that communicates with an electronic device 2, as best illustrated by FIG. 1. The electronic device 2 may be embodied using a personal computer, a laptop, a tablet computer, a personal digital assistant (PDA), a smart phone, etc. The electronic device 2 includes a touch screen 21, a dynamic image capturing module 22 and a microphone 23. The dynamic image capturing module 22 may be embodied using a front-facing camera or a rear-facing camera.

Figure 2:
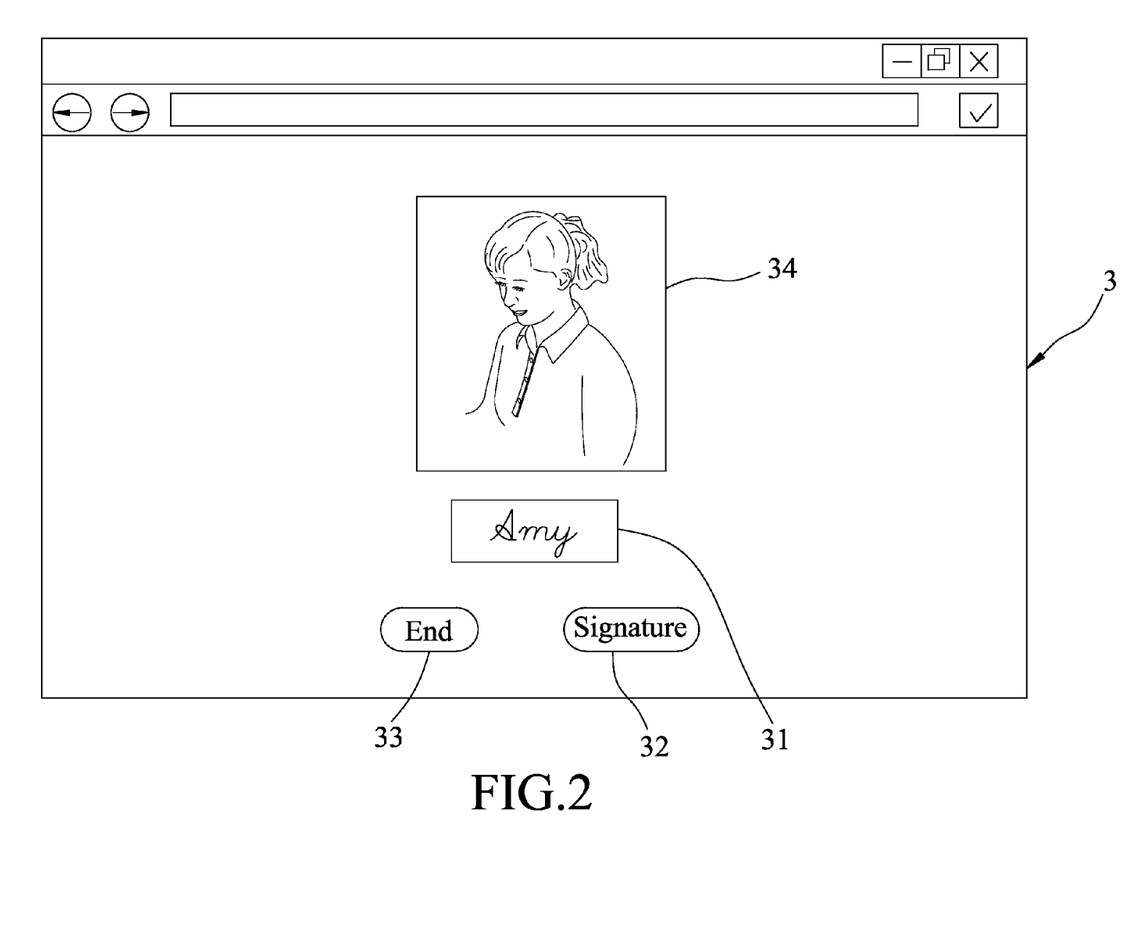
FIG. 2 is a schematic view of a webpage for receiving a handwritten signature of a signer.

The electronic device 2 is configured to communicate with the web server 1 by accessing a webpage 3 provided by the web server 1 (see FIG. 2) over a network, such as the Internet. The webpage 3 includes a signature area 31, an initiation button 32, a termination button 33 and a dynamic image display area 34.

Further referring to FIGS. 3 to 6, steps of the method for generating an electronic signature are illustrated.

Figure 3:
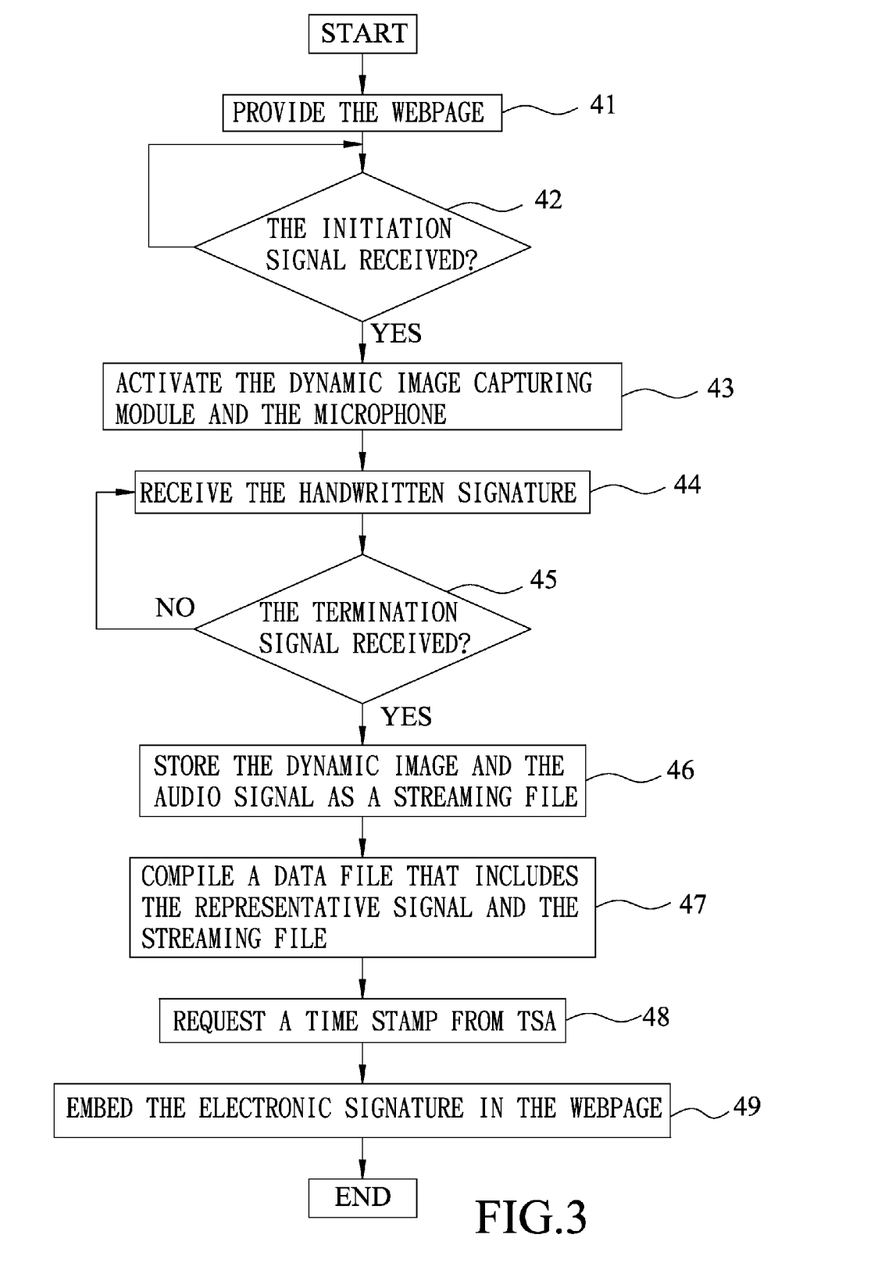
FIG. 3 is a flowchart illustrating the steps of the method of the preferred embodiment.

In step 41, the webpage 3 is provided by the web server 1, and is accessed by the electronic device 2 for display on the touch screen 21. The webpage 3 serves as an interface between the signer and the web server 1.

In step 42, the web server 1 continuously determines whether an initiation signal is received. That is, the signer is ready to input a handwritten signature via the electronic device 2, and presses the initiation button 32 on the webpage 3. When the initiation signal is received, the webpage 3 instructs the signer to input a handwritten signature on the signature area 31, and the flow proceeds to step 43. Otherwise, step 42 is repeated.

In step 43, the dynamic image capturing module 22 and the microphone 23 are activated.

Figure 4:
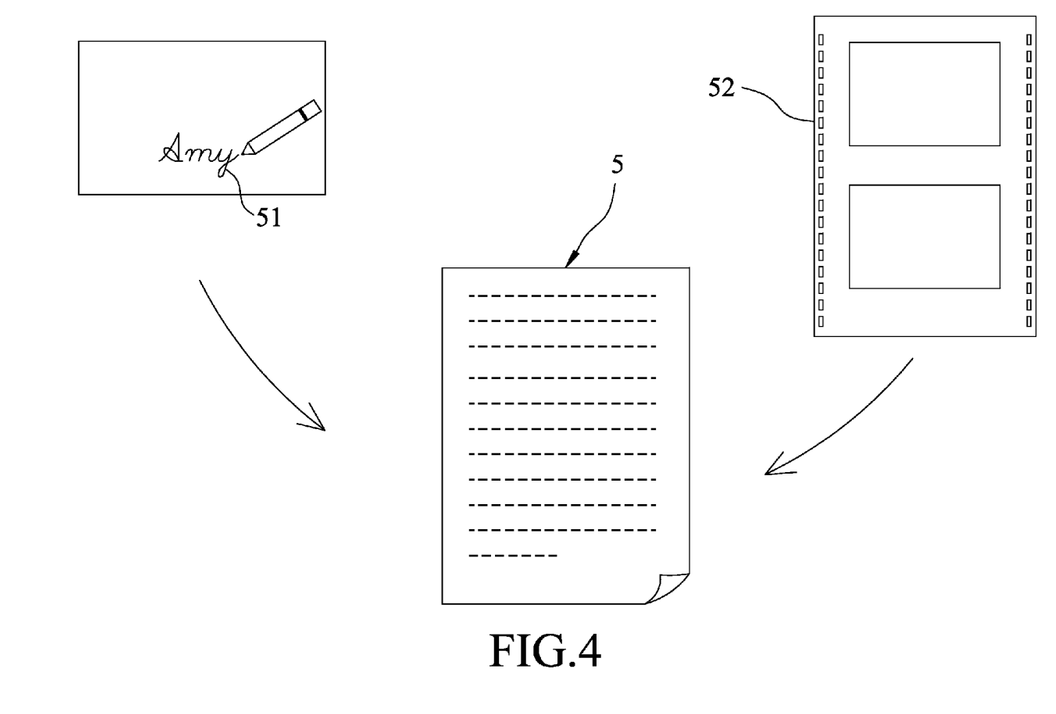
FIG. 4 is a schematic view of a data file including a representative signal and a streaming file regarding the signer.

In step 44, the web server 1 receives, from the electronic device 2, a representative signal 51 of the handwritten signature of the signer via the signature area 31. The representative signal is embedded with a markup language. In the case that the handwritten signature comprises a plurality of strokes, the web server 1 may receive a plurality of the representative signals 51 respectively representing the plurality of strokes of the handwritten signature, and each of the representative signals is embedded with a respective markup language. In this embodiment, the markup language is extensible markup language (XML).

Simultaneously, the web server 1 also receives a dynamic image and an audio signal, which are recorded respectively by the dynamic image capturing module 22 and the microphone 23, from the electronic device 2 by streaming. The dynamic image and the audio signal respectively present a motion and voice of the signer during signing the handwritten signature on the signature area 31, and are simultaneously captured by the dynamic image capturing module 22 and the microphone 23. The audio signal may include orally spoken contents associated with the handwritten signature. For example, when the singer is required to read and adopt a user agreement, the webpage 3 may instruct the signer to articulate the contents of the user agreement, and the microphone 23 records the voice of the signer reading aloud the user agreement as the audio signal.

In step 45, the web server 1 continuously determines whether the termination signal is received. That is, the signer has finished inputting the handwritten signature via the electronic device 2, and presses the termination button 33 on the webpage 3. When the termination signal is received, the flow proceeds to step 46. Otherwise, steps 44 and 45 are repeated.

In step 46, the web server 1 stores the dynamic image and the audio signal as a streaming file 52.

In step 47, the web server 1 compiles a data file 5 that includes the representative signal 51 and the streaming file 52. The data file 5 may be compiled as an .xml document class so as to be executable by the webpage 3 as an electronic signature.

In step 48, the web server 1 communicates with a time stamping authority (TSA) to request a time stamp therefrom. Afterward, the web server 1 incorporates the time stamp into the data file 5. Specifically, the web server 1 performs a hash function on the data file 5 to generate a hashed data file, and transmits the hashed data file to the TSA. Then, the TSA generates a time stamp based on the hashed data file, and transmits the time stamp back to the web server 1.

It is noted that the time stamp incorporated into the data file 5 may increase the validity of the electronic signature. After the electronic signature is created, the data file 5 may be transmitted back to the TSA, which may identify an exact time of creation the electronic signature using the time stamp.

In step 49, the data file 5 is executed to embed, in the webpage 3, the electronic signature including a first object 53 and a second object 54. In this embodiment, the first object 53 represents the representative signal 51, and the second object 54 plays to the streaming file 52.

Specifically, the representative signal 51 is generated as a scalable vector graphics (SVG) image, and is programmed using JavaScript. As a result, the first object 53 may be able to display the representative signal 51 in a form of an image or an animation.

The second object 54 is encoded as a web-based streaming video. The web-based streaming video may be in a format selected from the following: H.263, H.264, flash video (.f4v), Realmedia (.rm), Windows Media Video (.wmv), .m4v, Quicktime File Format (.mov), etc.

Figure 5:
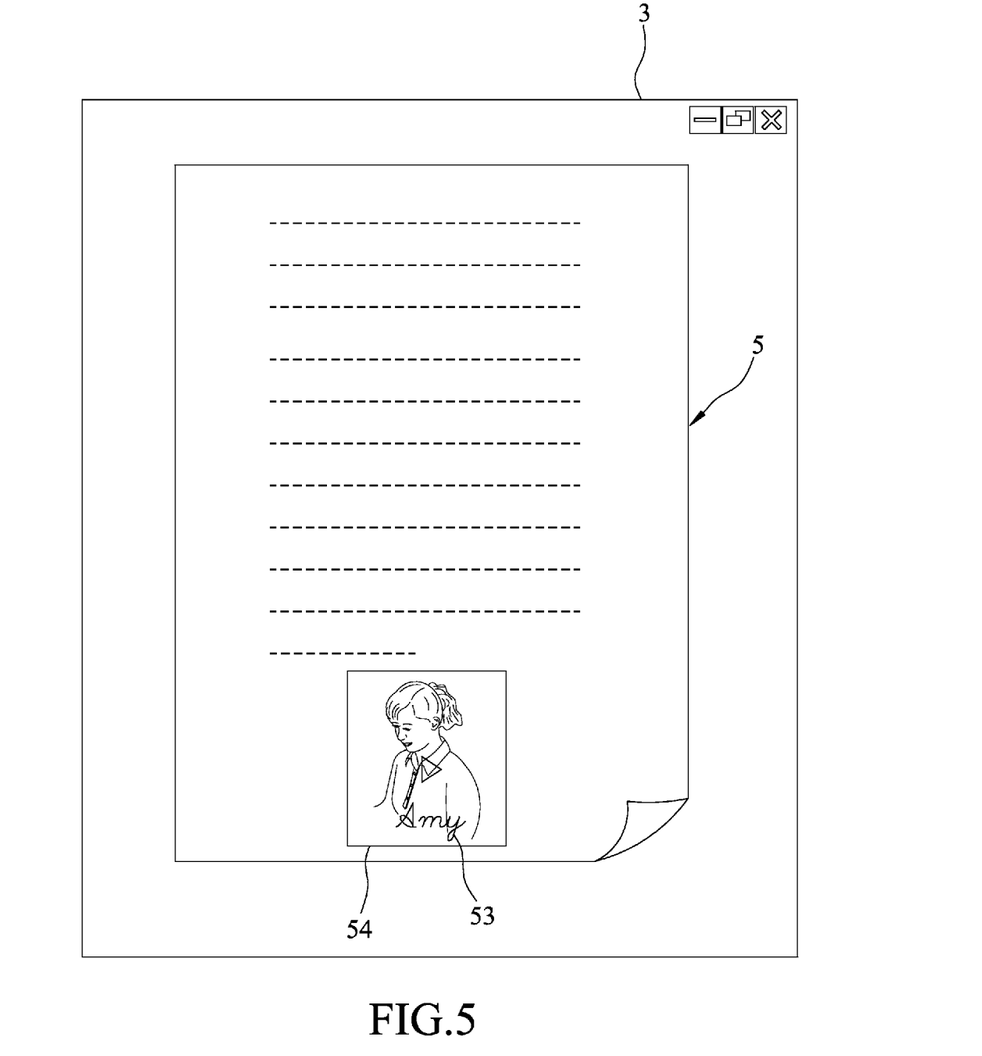
FIGS. 5 and 6 illustrate implementations in which a first object and a second object of an electronic signature are embedded in the webpage.
Figure 6:
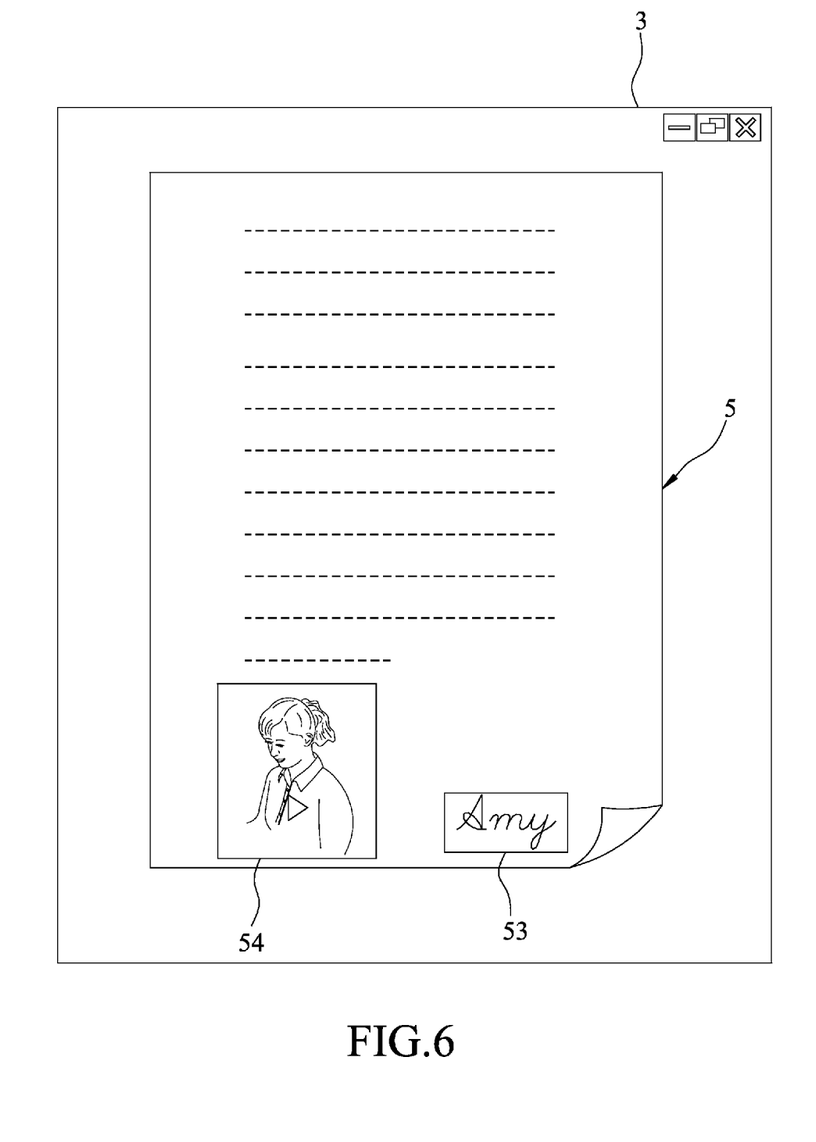

In one implementation as shown in FIG. 5, the first object 53 is superimposed on the second object 54. In another implementation as shown in FIG. 6, the first object 53 and the second object 54 are embedded at separate positions on the webpage 3.

In brief, the method according to this invention may be utilized in occasions such as electronic commerce activities (e.g., authorizing a credit card payment) or signing an electronic document (e.g., a consent to surgery, a transaction, a contract, etc.). The electronic signature thus created includes not only the first object 53 that represents the handwritten signature, but also the second object 54 that plays the streaming file 52 of the recorded motion and voice of the signer during signature/articulation. The time stamp incorporated in the electronic signature may provide enhanced security.

It is noted that in case another person is signing the signature on behalf of the signer, the method of this invention is able to identify this person using the second object 54.

Moreover, there is no need to keep an electronic credential/private key to perform the method for generating the electronic signature according to this invention. Further, by streaming, temporary files used to play the first and second objects 53, 54 will be deleted after related operations are executed, and data used to generate the electronic signature will not be stored on the web server 1 and the electronic device 2. Accordingly, the risk of manipulation of the electronic signature is reduced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for generating an electronic signature to be implemented by a web server communicating with an electronic device, the electronic device including a touch screen and a dynamic image capturing module, the method comprising the steps of:
   (a) providing, by the web server, a webpage to be displayed on the touch screen of the electronic device, the webpage including a signature area;
   (b) receiving, by the web server, a dynamic image and a representative signal of a handwritten signature from the electronic device, the representative signal being embedded with a markup language, the handwritten signature being inputted by a signer using the touch screen, the dynamic image presenting a motion of the signer during input of the handwritten signature captured by the dynamic image capturing module simultaneously with the input of the handwritten signature;
   (c) storing, by the web server, the dynamic image as a streaming file;
   (d) compiling, by the web server, a data file that includes the representative signal and the streaming file;
   (e) executing, by the web server, the data file in the webpage as an electronic signature, the data file is executed to embed, in the webpage, a first object representing the representative signal and a second object playing the streaming file; and
   deleting temporary files used to play the first and second objects after related operations are executed;

wherein the first object displays the representative signal in a form of an animation.

2. The method of claim 1, the web server being configured to communicate with a time stamping authority (TSA),
wherein, in step (d), the web server requests a time stamp from the TSA and incorporates the time stamp in the data file.

3. The method of claim 1, wherein, in step (b), the web server is configured to receive the dynamic image from the electronic device by streaming.

4. The method of claim 1, wherein the webpage provided in step (a) further includes an initiation button, and the web server is configured to execute step (b) upon receiving an initiation signal from the electronic device, the initiation signal being transmitted by the electronic device when the initiation button is pressed.

5. The method of claim 1, wherein the webpage provided in step (a) further includes a termination button, and the web server is configured to execute steps (c) to (e) upon receiving a termination signal from the electronic device, the termination signal being transmitted by the electronic when the termination button is pressed.

6. The method of claim 1, wherein the first object is superimposed on the second object.

7. The method of claim 1, wherein the first object and the second object are embedded at separate positions on the webpage.

8. The method of claim 1, wherein the electronic signature is generated as a scalable vector graphics (SVG) image, and is programmed using JavaScript.

9. The method of claim 1, wherein the streaming file is encoded as a web-based streaming video.

10. The method of claim 1, wherein:
in step (b), the web server receives a plurality of the representative signals respectively representing a plurality of strokes of the handwritten signature, and each of the representative signals is embedded with a respective markup language.

11. The method of claim 1, wherein, in step (b), the markup language is extensible markup language (XML).

12. The method of claim 1, the electronic device further including a microphone, wherein in step (b), the web server further receives an audio signal from the electronic device, the audio signal is captured by the microphone during the signer inputting the handwritten signature, and in step (c), the streaming file stored by the web server includes the dynamic image and the audio signal.

* * * * *